US007672744B2

(12) United States Patent
Oh et al.

(10) Patent No.: US 7,672,744 B2
(45) Date of Patent: Mar. 2, 2010

(54) METHOD AND AN APPARATUS FOR DECODING AN AUDIO SIGNAL

(75) Inventors: Hyen-O Oh, Gyeonggi-do (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/405,016

(22) Filed: Mar. 16, 2009

(65) Prior Publication Data

US 2009/0171676 A1 Jul. 2, 2009

Related U.S. Application Data

(63) Continuation of application No. 11/941,048, filed on Nov. 15, 2007.

(60) Provisional application No. 60/865,908, filed on Nov. 15, 2006, provisional application No. 60/869,077, filed on Dec. 7, 2006, provisional application No. 60/869,080, filed on Dec. 7, 2006, provisional application No. 60/889,715, filed on Feb. 13, 2007, provisional application No. 60/955,395, filed on Aug. 13, 2007, provisional application No. 60/883,567, filed on Jan. 5, 2007.

(51) Int. Cl.

| | |
|---|---|
| ***G06F 17/00*** | (2006.01) |
| ***H04R 5/00*** | (2006.01) |
| ***G11B 27/00*** | (2006.01) |
| ***H04N 5/93*** | (2006.01) |

(52) U.S. Cl. ............................ 700/94; 381/17; 381/23; 386/54

(58) Field of Classification Search ..................... 369/4; 381/17, 18, 20, 21, 23, 119; 386/54, 96, 386/98, 99; 700/94

See application file for complete search history.

(56) References Cited

U.S. PATENT DOCUMENTS 5,682,433 A * 10/1997 Pickard et al. ................ 381/17

(Continued)

FOREIGN PATENT DOCUMENTS

EP 0079886 8/1986

(Continued)

OTHER PUBLICATIONS

Faller, Christof, et al., "Binaural Cue Coding Applied to Audio Compression with Flexible Rendering," Audio Engineering Society Convention Paper 5686, Presented at the 113$^{th}$ Convention, Los Angeles, California, Oct. 5-8, 2002, 10 pages.

(Continued)

*Primary Examiner*—Curtis Kuntz
*Assistant Examiner*—Jesse A Elbin
(74) *Attorney, Agent, or Firm*—Fish & Richardson P.C.

(57) ABSTRACT

A method of decoding for an audio signal comprises the step of receiving a downmix of an audio signal, an object information, and a mix information, the object information including an object level information, an object correlation information, and an object gain information, generating a downmix processing information using the object information and the mix information, and processing the downmix of the audio signal using the downmix processing information. Various embodiments of the present invention provide a method and an apparatus for decoding multi-object audio signals fast and efficiently by reducing process time, computer resource, thereby relieving the resource requirement like the wide bandwidth. The object parameters according to the embodiments of the present invention can provide backward compatibility in the view of the channel-oriented decoding process.

5 Claims, 9 Drawing Sheets

1000

U.S. PATENT DOCUMENTS

| | | | | |
|---|---|---|---|---|
| 5,974,380 | A | 10/1999 | Smyth et al. | |
| 6,026,168 | A | 2/2000 | Li et al. | |
| 6,122,619 | A | 9/2000 | Kolluru | |
| 6,128,597 | A | 10/2000 | Kolluru | |
| 6,141,446 | A | 10/2000 | Boliek | |
| 6,496,584 | B2 | 12/2002 | Irwan et al. | |
| 6,584,077 | B1 | 6/2003 | Polomski | |
| 6,839,438 | B1 * | 1/2005 | Riegelsberger et al. | 381/18 |
| 6,952,677 | B1 | 10/2005 | Absar | |
| 7,103,187 | B1 | 9/2006 | Neuman | |
| 2003/0023160 | A1 | 1/2003 | Minkoff | |
| 2003/0117759 | A1 | 6/2003 | Cooper | |
| 2003/0236583 | A1 | 12/2003 | Baumgarte et al. | |
| 2004/0111171 | A1 | 6/2004 | Jang et al. | |
| 2004/0161116 | A1 * | 8/2004 | Tsuji et al. | 381/23 |
| 2005/0089181 | A1 | 4/2005 | Polk, Jr. | |
| 2005/0157883 | A1 | 7/2005 | Herre | |
| 2005/0157884 | A1 * | 7/2005 | Eguchi | 381/23 |
| 2005/0169482 | A1 * | 8/2005 | Reams et al. | 381/17 |
| 2005/0195981 | A1 | 9/2005 | Faller | |
| 2006/0085200 | A1 | 4/2006 | Allamanche | |
| 2006/0109992 | A1 * | 5/2006 | Roeder et al. | 381/18 |
| 2006/0115100 | A1 | 6/2006 | Faller | |
| 2006/0133618 | A1 | 6/2006 | Villemoes | |
| 2007/0083365 | A1 | 4/2007 | Shmunk | |
| 2007/0165869 | A1 * | 7/2007 | Ojanpera | 381/23 |
| 2007/0280485 | A1 * | 12/2007 | Villemoes | 381/119 |
| 2008/0002842 | A1 | 1/2008 | Neusinger et al. | |

FOREIGN PATENT DOCUMENTS

| | | |
|---|---|---|
| EP | 1 416 769 | 5/2004 |
| EP | 1565036 | 8/2005 |
| EP | 1640972 | 3/2006 |
| EP | 1691348 | 8/2006 |
| EP | 1784819 | 4/2008 |
| JP | 2004170610 | 6/2004 |
| JP | 2004080735 | 9/2004 |
| JP | 18323408 | 11/2006 |
| KR | 20000053152 | 8/2000 |
| KR | 1020060049941 | 5/2006 |
| KR | 1020060049980 | 5/2006 |
| KR | 1020060060927 | 6/2006 |
| WO | 92/12607 | 7/1992 |
| WO | 98/058450 | 12/1998 |
| WO | 03/090207 | 10/2003 |
| WO | 03/090208 | 10/2003 |
| WO | 2005/029467 | 3/2005 |
| WO | 2005/086139 | 9/2005 |
| WO | 2006/002748 | 1/2006 |
| WO | 2006/008683 | 1/2006 |
| WO | 2006/084916 | 8/2006 |
| WO | 2006/132857 | 12/2006 |
| WO | 2007/013775 | 2/2007 |
| WO | 2008/035275 | 3/2008 |
| WO | 2008/046530 | 4/2008 |

OTHER PUBLICATIONS

Engdegård, Jonas, et al., "Spatial Audio Object Coding (SAOC)—The Upcoming MPEG Standard on Parametric Object Based Audio Coding," Audio Engineering Society Convention Paper 7377, Presented at the 124$^{th}$ Convention, Amsterdam, The Netherlands, May 17-20, 2008, 15 pages.

Faller, C., "Parametric Joint-Coding of Audio Sources", Audio Engineering Society Convention Paper 6752, May 2006, Paris, France, 12 pages.

Breebaart, et al., "MPEG Spatial Audio Coding/MPEG Surround: Overview and Current status," Audio Engineering Society the 119th Convention, New York, New York, Oct. 7-10, 2005, pp. 1-17 (See pp. 4-6).

de Smet, P., et al., "Subband Based MPEG Audio Mixing for Internet Streaming Applications," IEEE, 2001, 4 pages.

Faller, C., 'Parametric coding of spatial audio' Presentee a La Faculte Informatique Et Communications, Institute de Systemes de Communication, Section Des Systemes De Communication, Ecole Polytechnique Federale De Lausanne, Pour L'Obtention Du Grade De Docteur Es Sciences, These No. 3062, 2004. See Chapter 3. Parametric Coding of Spatial Audio Using Perceptual Cues, 165 pages.

Faller, C., "Coding of spatial audio compatible with different playback formats," Audio Engineering Society, Convention Paper, In 117th Convention, Oct. 28-31, 2004, San Francisco, CA, XP002364728.

Kim, J., "Lossless Wideband Audio Compression: Prediction and Transform," 2003, 196 pages.

Liebchen, T., et al., "The MPEG-4 audio lossless coding (ALS) standard—Technology and applications," AES 119$^{th}$ Convention paper, Oct. 7-10, 2005, New York, USA.

Liebchen, T., et al., "Improved Forward-Adaptive Prediction for MPEG-4 audio lossless coding," AES 118$^{th}$ Convention paper, May 28-31, 2005, Barcelona, Spain.

Vera-Candeas, P., et al., "A New Sinusoidal Modeling Approach for Parametric Speech and Audio Coding," Proceedings of the 3rd International Symposium on Image and Signal Processing and Analysis, 2003, XP010705037.

European Search Report for App. Ser. No. EP07009077, dated Aug. 23, 2007, 3 pages.

Notice of Allowance dated Feb. 28, 2009 for Korean App. Ser. Nos. 2007-63180; 63187; 63291 and 63292.

International Search Report for App. Ser. No. PCT/KR2006/002974 dated Nov. 17, 2006 2 pages.

International Search Report for App. Ser. No. PCT/KR2007/004805, dated Feb. 11, 2008, 2 pages.

International Search Report for App. Ser. No. PCT/KR2007/005014, dated Jan. 28, 2008, 2 pages.

International Search Report for App. Ser. No. PCT/KR2007/005740, dated Feb. 27, 2008, 2 pages.

International Search Report for App. Ser. No. PCT/KR2007/006318, dated Mar. 17, 2008, 2 pages.

International Search Report for App. Ser. No. PCT/KR2008/000073, dated Apr. 22, 2008, 3 pages.

International Search Report for App. Ser. No. PCT/KR2008/000836, dated Jun. 11, 2008, 3 pages.

International Search Report for App. Ser. No. PCT/KR2008/005292, dated Feb. 28, 2009, 3 pages.

International Search Report for App. Ser. No. PCT/KR2008/005291, Jan. 30, 2009, 3 pages.

"Draft Call for Proposals on Spatial Audio Object Coding" Joint Video Team (JVT) of ISO/IEO MPEG & ITU-T VCEG (ISO/IECJTCI/SC29/WG11 and ITU-T SG16 Q6), XX, XX, No. N8639, (2006), XP030015133.

European Examiner Ervin Dobler, Supplementary European Search Report and European Search Opinion for Application No. EP07834046.0, dated Dec. 16, 2009, 6 pages.

* cited by examiner

METHOD AND AN APPARATUS FOR DECODING AN AUDIO SIGNAL

RELATED APPLICATIONS

This application is a continuation application of, and claims priority to, U.S. patent application Ser. No. 11/941,048, filed Nov. 15, 2007, which claims the benefit of U.S. Provisional Patent Application Nos. 60/865,908, 60/869,077, 60/869,080, 60/889,715, 60/955,395, and 60/883, 567, filed on Nov. 15, 2006, Dec. 7, 2006, Dec. 7, 2006, Feb. 13, 2007, Aug. 13, 2007, and Jan. 5, 2007, respectively, each of which is hereby incorporated by reference.

BACKGROUND

1. Field of the Invention

The present invention relates to a method and an apparatus for decoding an audio signal, and more particularly, to a method and an apparatus for decoding an audio signal received via various digital medium.

2. Discussion of the Related Art

While downmixing several audio objects to a mono or a stereo audio signal, information (e.g., parameters) from individual object signals of the audio signal can be extracted. This information can be used in a decoder for decoding of the audio signal.

A MCU (Multipoint Control Unit) is a device that can be used in a teleconference to articulate provided signals from a remote place through the conference call.

A conventional MCU combiner generally makes a combined signal into multi-channel audio signals. But when multi-channel audio signals having only multi-channel parameters are used in the MCU, the MCU only can control the gain and panning of one of the channels and cannot control the gain and panning of individual object signals.

A decoder receives a downmix signal and side information, and can generate an output signal using the side information. The output signal may be rendered based on other input information such as a user control or a playback configuration. In order to control the individual object signals, the decoder may receive multi-object signals and process to decode them.

However, an apparatus and method for decoding multi-object signals needs a wide bandwidth. Accordingly, a new apparatus and method for decoding multi-object signals is needed to relieve the resource requirement of a wide bandwidth. Moreover, for backward compatibility with channel-oriented decoding, a new apparatus and method is needed for providing side information corresponding to audio objects which can be converted to multi-channel parameters.

SUMMARY

Various embodiments of the present invention are directed to a method and an apparatus for decoding an audio signal that substantially improves disadvantages of the related art and obviates one or more problems of related art.

An object of the present invention is to provide a method for decoding an audio signal by using object information, including an object level information and an object gain information, to modify the downmix of an audio signal by changing the contribution of each object signal to each downmix channel.

Another object of the present invention is to provide an apparatus for decoding an audio signal by using object information, including an object level information and an object gain information to modify the downmix of an audio signal by changing the contribution of each object signal to each downmix channel.

Another object of the present invention is to provide a method and an apparatus for decoding an audio signal, comprising a downmix signal and a combined object parameter to be made in a MCU combiner, to control object gain and output in a teleconference or other application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

DESCRIPTION OF DRAWINGS

The accompanying drawings, which are included to provide a further understanding of the invention, illustrate the preferred embodiments of the invention, and together with the description, serve to explain the principles of the present invention. In the drawings.

DETAILED DESCRIPTION

Reference will now be made in detail to the preferred embodiment of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the application as necessary and will hereinafter be disclosed in the following description of the present invention. Therefore, it is preferable that the terms defined by the applicant be understood on the basis of their meanings in the present invention.

Figure 1:
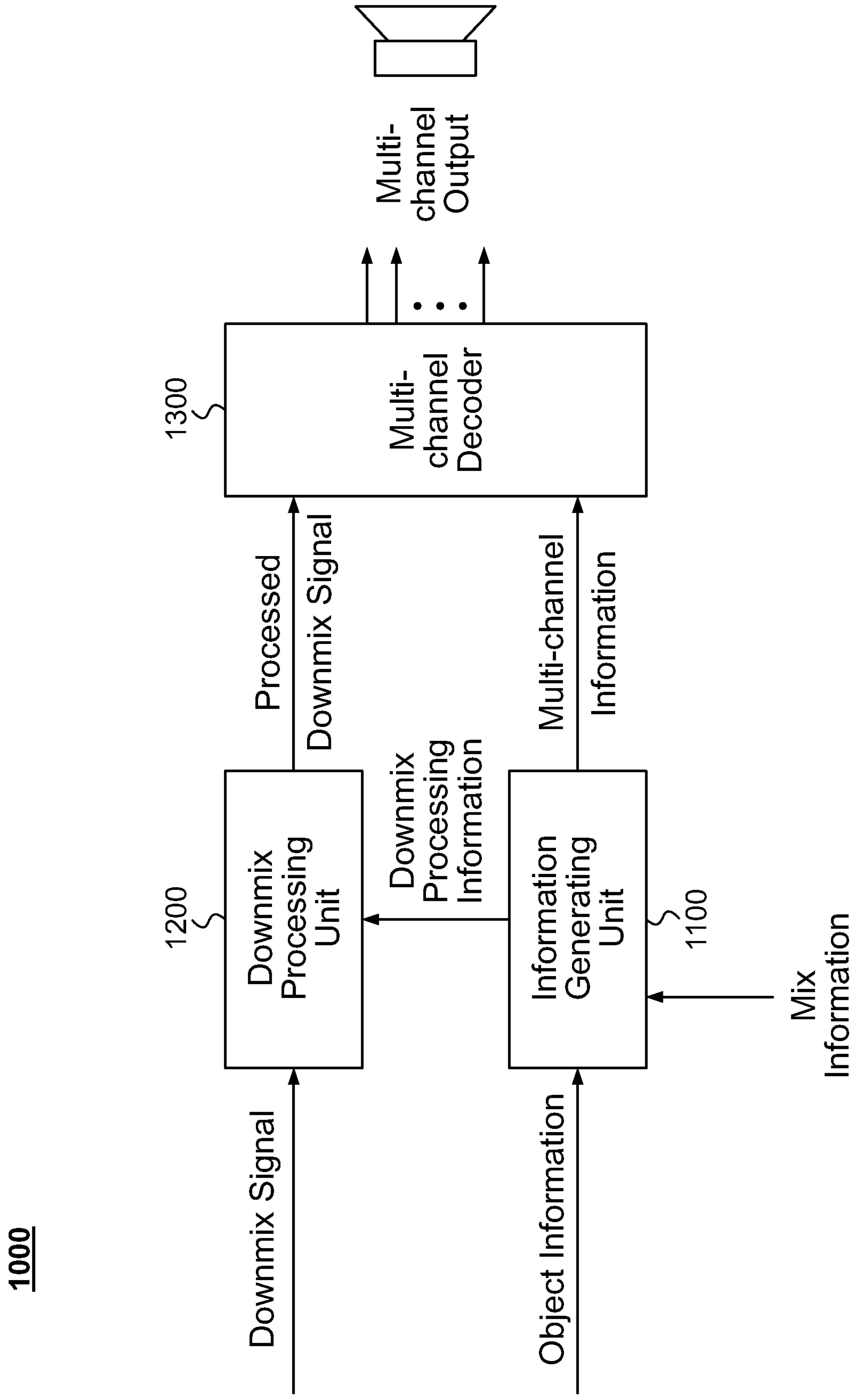
FIG. 1 is an exemplary block diagram of an apparatus for decoding an audio signal according to one embodiment of the present invention.
Figure 3:
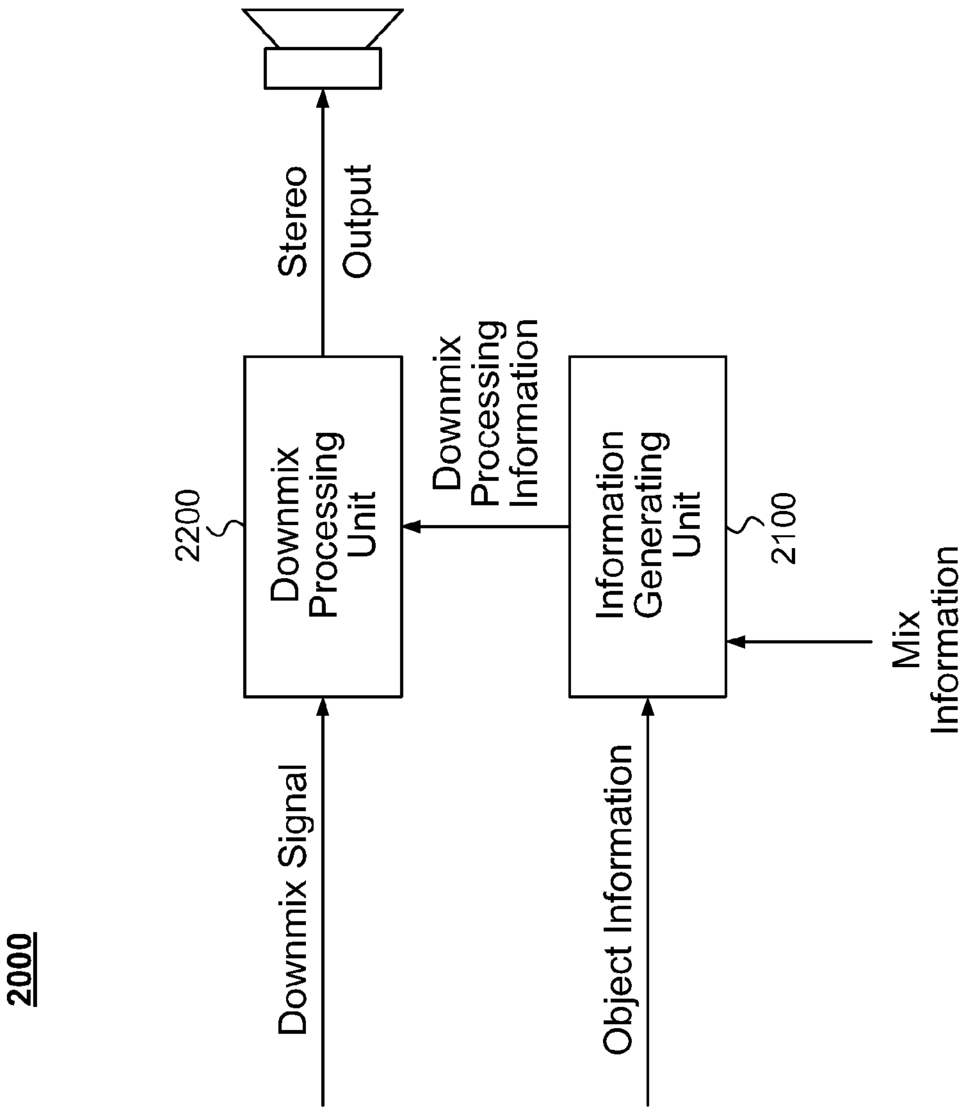
FIG. 3 is an exemplary block diagram of an apparatus for decoding an audio signal according to other embodiment of the present invention.

FIG. 1 is an exemplary block diagram of an apparatus 1000 for decoding an audio signal according to one embodiment of the present invention. FIG. 3 is an exemplary block diagram of an apparatus 2000 for decoding an audio signal according to another embodiment of the present invention.

The two embodiments of the apparatus 1000 and 2000 differ in that the apparatus 1000 has a multi-channel decoder 1300 while the apparatus 2000 does not have the multi-channel decoder 1300. Other elements, such as a parameter generating unit 1100 and a downmix processing unit 1200 and 2200 are the same as shown in FIGS. 1 and 3.

Referring FIG. 1, an apparatus 1000 for decoding an audio signal (hereinafter also referred to as 'a decoder 1000') includes a parameter generating unit 1100, a downmix processing unit 1200, and a multi-channel decoder 1300. The parameter generating unit 1100 is configured to receive object information and mix information from a user control or a bitstream, and to generate downmix processing information.

The object information can include object level information, object correlation information, and object gain information. The object level information can be generated by normalizing an object level corresponding to each object using one of the object levels as reference information. The object correlation information can be provided from a combination of two selected objects. The object gain information can include object gain value information or object gain ratio information. The downmix processing information can include a parameter for controlling object gain and object panning, which is input to the downmix processing unit 1200.

The downmix processing unit 1200 can be configured to receive a downmix of an audio signal with the downmix processing information from the parameter generating unit 1100. The downmix processing unit 1200 can process the downmix using the downmix processing information, thereby generating the processed downmix signal. For example, the downmix processing unit 1200 can apply the downmix processing information to the downmix of the audio signal in order to change one or more of object gain and object position of the downmix of the audio signal to generate the processed downmix.

The processed downmix may be input to the multi-channel decoder 1300 to be upmixed and output by an output device such as a speaker. A multi-channel parameter output from the parameter generating unit may be also input to the multi-channel decoder 1300 In some embodiments of the present invention, the multi-channel decoder 1300 can be used as same as a decoder of MPEG Surround system.

Figure 2:
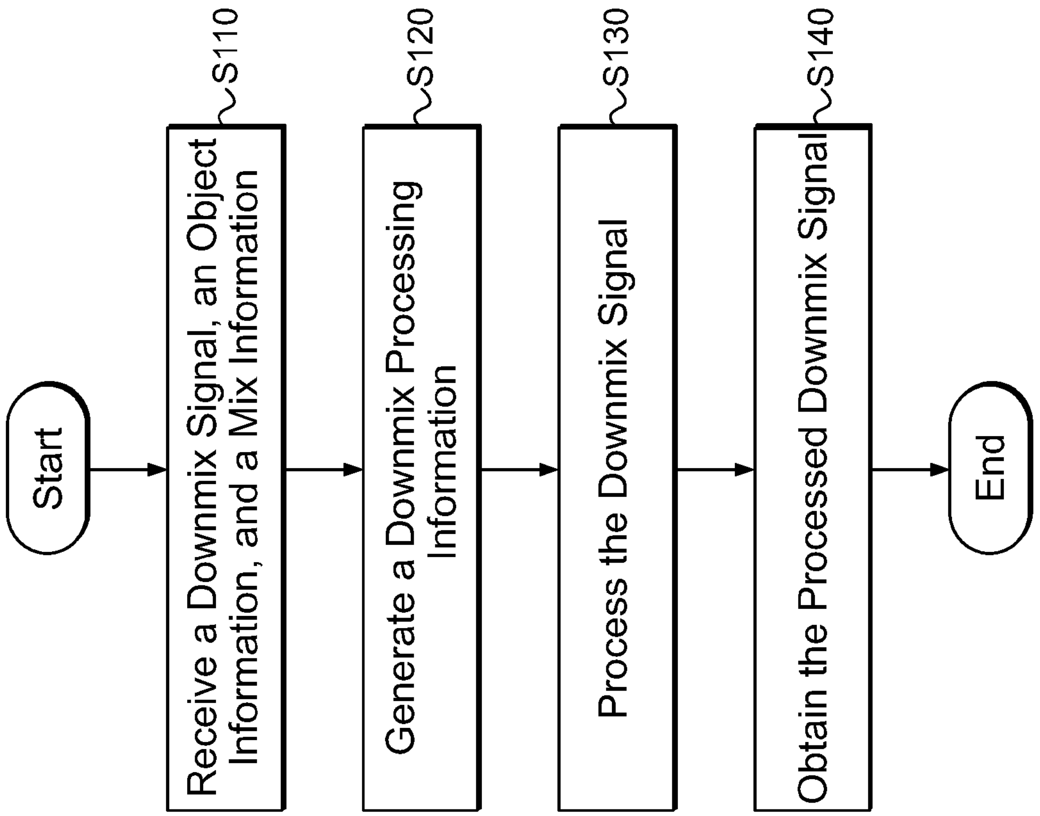
FIG. 2 is a flow chart illustrating an audio signal decoding method in accordance with an embodiment of the present invention.

Alternatively, the processed downmix signal may be directly transmitted to and output by the output device as the device 2000 shown in FIG. 2. In order to directly output the processed signal via speakers, the downmix processing unit 2200 may include a synthesis filter bank and output PCM data. The unit 2200 may also select whether to directly output as PCM signal or input to the multi-channel decoder by user selection.

FIG. 2 is a flow diagram of a example decoding method for an audio signal in accordance with the present invention. Reference will also be made to FIG. 1. In step S110, a downmix of an audio signal, object information, and mix information is received. Step S120 generates downmix processing information using the object information and the mix information. In step S130 and S140, a processed downmix is generated by processing the downmix of the audio signal using the downmix processing information.

The configuration of the parameter generating unit 1100 shall be explained in detail with reference to FIG. 4 to FIG. 6.

1. Object Information 1.1 Reference Information and Object Level Information

Figure 4:
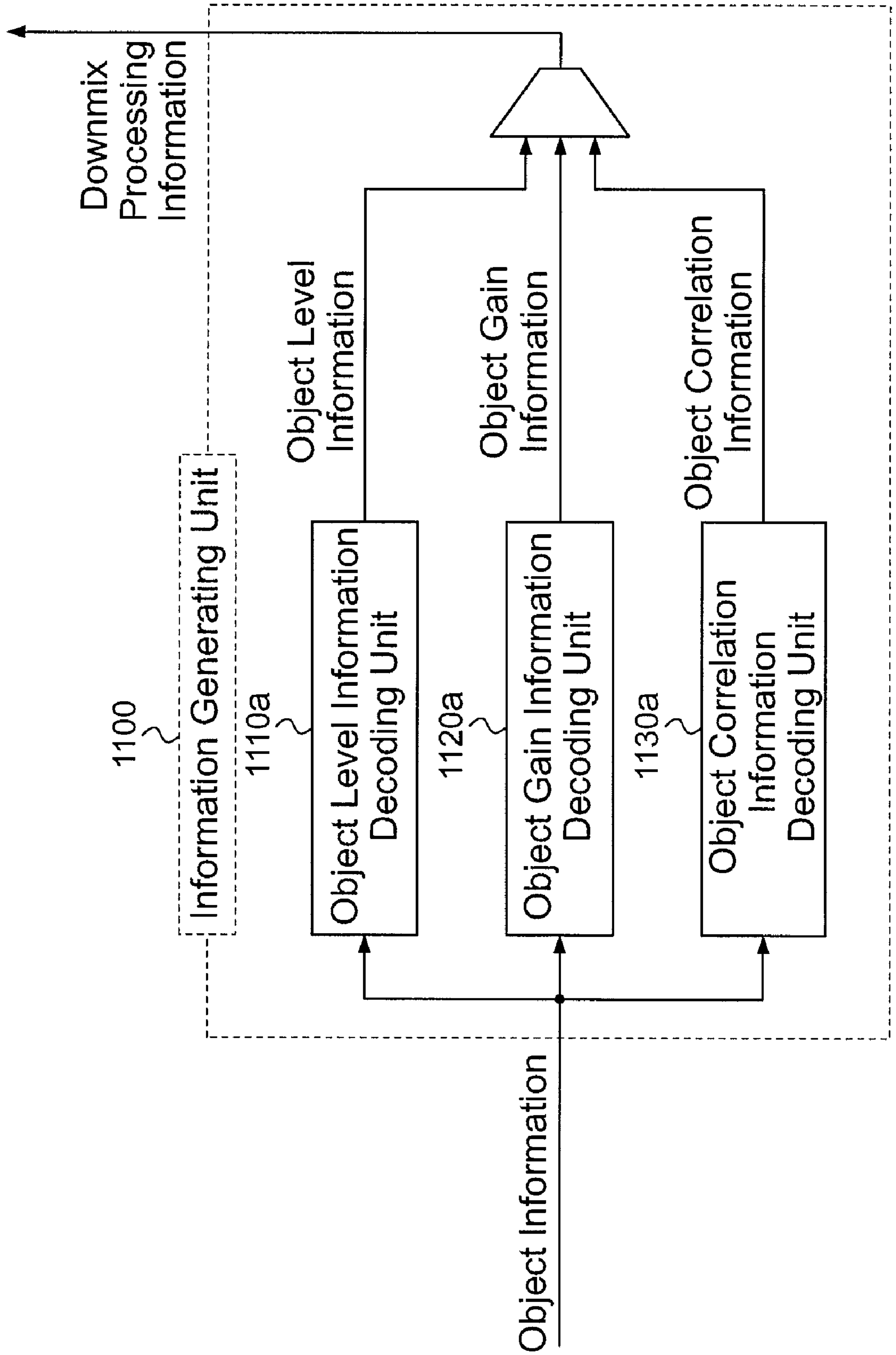
FIG. 4 is an exemplary block diagram of a parameter generating unit according to one embodiment of the present invention.
Figure 5:
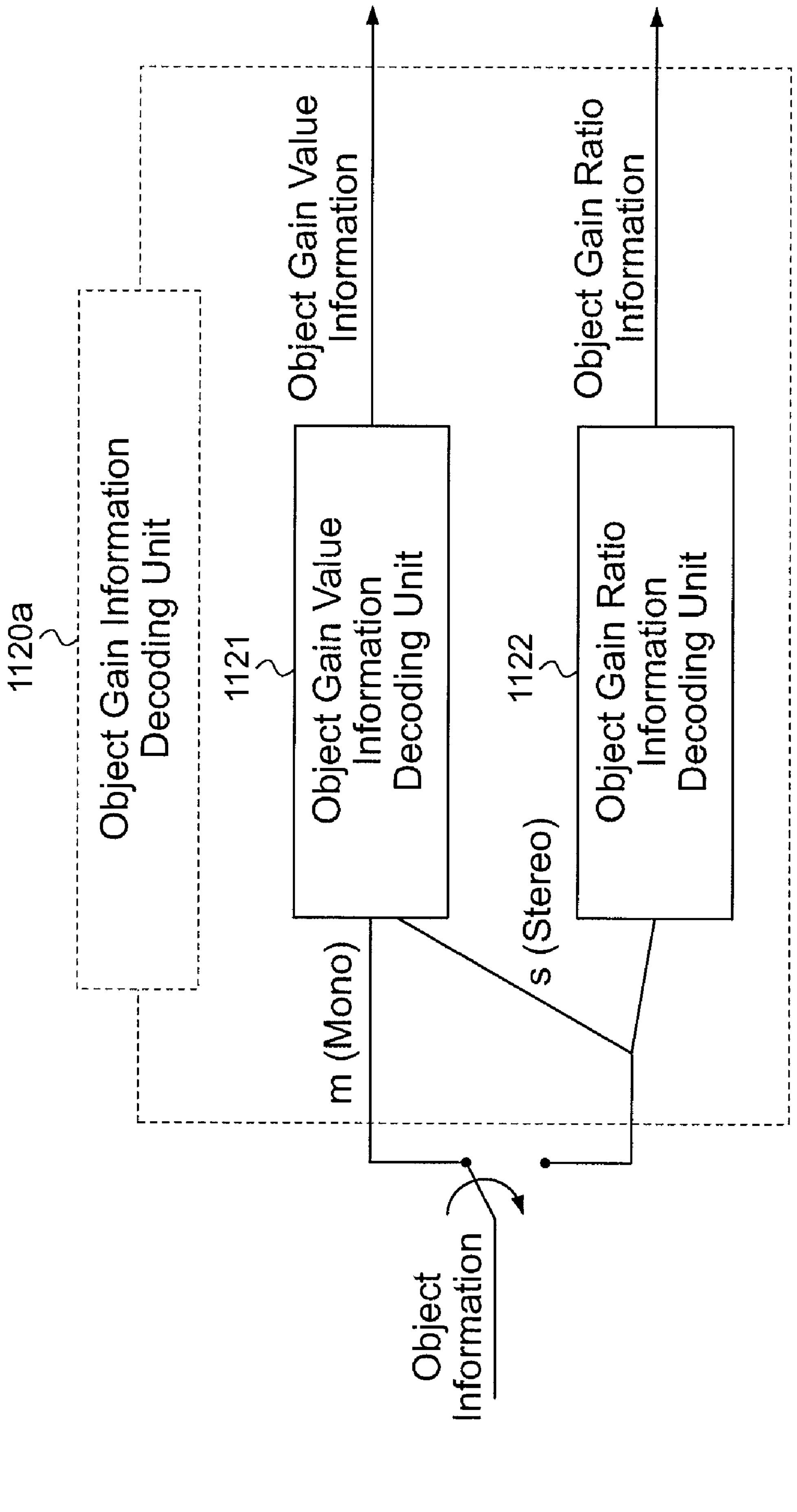
FIG. 5 is an exemplary block diagram of a object gain information generating unit according to one embodiment of the present invention.

FIG. 4 is a block diagram of an exemplary apparatus for processing an audio signal according to one embodiment of present invention, in particular, a block diagram of a parameter generating unit 1100. The parameter generating unit 1100 can be configured to receive object information and to generate downmix processing information using the object parameter.

The parameter generating unit 1100 can include object level information decoding unit **1110*a*, object gain information generating unit 1120*a*, and object correlation information generating unit 1130*a***.

The downmix of an audio signal includes a number of object signals, and the object signals each have an associated object level.

The object level information can be generated by normalizing the object level using reference information, which may include a reference object level. In some embodiments, the reference object level can be the largest object level among a number of object levels.

For example, a downmix of an audio signal can include objects_i, where the object level of each of the objects_i is given by Ps_i, where i is a positive integer which represents the total number of object signals in an audio signal.

If object level energies are transmitted as is to encode an object parameter, the object parameter can include object information as follows:

Ps_i can be obtained as various methods. For example, Ps_i may be s_i(n)^2 or E[s_i(n)^2]. Ps_i may be transmitted as information corresponding to each object level information. In this example, s_i(n) refers to an ith object signal, and s_i(n) can be either a time domain signal or a subband signal within a given band.

However, if the object level information corresponding to each object signal is transmitted as the value itself the object level of an object signal may be difficult to quantize due to an excessive increase in a variation of dynamic range.

Thus, the object level information may be normalized using reference information, such as the largest object level energy of all object energies. The object level information may be transmitted as in Formula 1 below:

*E[s_i(n)^2]/E[r_1(n)^2],r_1(n)*=reference information, where reference information is denoted as r_1. [Formula 1]

In some embodiments, the object level information includes a range of values that are less than or equal to 1.

Therefore, dynamic range can be compressed enough to encode an audio signal.

Additionally, the object level information may include reference information, default information, original object level energy to use in other signal processes. The object level information corresponds to each object signal, and object level information can include an object level for each object signal in the downmix signal.

1.2 Object Gain Information

The object parameter comprises an object gain information including at least one of an object gain value information and an object gain ratio information. FIG. 5 is a block diagram of an exemplary apparatus for processing an audio signal according to one embodiment of present invention, in particular, a block diagram of an object gain information decoding unit **1120*a* of the parameter generating unit 1100**.

The object gain information generating unit **1120*a* can include an object gain value information generating unit 1121** and an object gain ratio information generating unit 1122. The object gain information relates to a downmix method where one object signal is used to generate a downmix signal having more than one channel.

1.2.1 Object Gain Value Information

The object gain value information can include a gain value of an object. In some embodiments of the present invention, the object gain is applied to each object signal before generating the processed downmix.

For example, when the downmix of an audio signal includes a plurality of objects, each object gain value information corresponding to each object is multiplied to the object level of each object to generate each gained object, and all of the gained objects are summed to generate the processed downmix, as described by Formula 2.

$$X=\mathrm{sum}\{a\_i*s\_i\}, \quad \text{[Formula 2]}$$

where X is a processed downmix signal to be transmitted to a mono channel, s_i is an object level, and a_i is object gain value information of an object contributing to each channel.

1.2.2 Object Gain Ratio Information

The object gain information can include object gain ratio information as well as object gain value information. The object gain ratio information can include a ratio value between the gains of each object signal contributing to each channel of the processed downmix signal.

The object gain ratio information can be used to process the downmix signal by the Downmix Processing Unit 1200, thereby obtaining the processed downmix signal to be transmitted through two (e.g., stereo) or more channels. In the case of a stereo channel, a processed downmix to be transmitted through each of the stereo channels is shown by Formula 3. The object gain ratio information can be obtained from Formula 4.

$$x\_1=\mathrm{sum}\{a\_i*s\_i\}$$

$$x\_2=\mathrm{sum}\{b\_i*s\_i\}, \quad \text{[Formula 3]}$$

where x_1 and x_2 are processed downmix signals to be transmitted through each channel, respectively, s_i is an object level, and a_i and b_i are an object gain value information of an object contributing to each channel of the stereo signal. Formula 4 is as follows:

$$m\_i=a\_i/b\_i, \quad \text{[Formula 4]}$$

where m_i is an object gain ratio information of each object.

The object gain information, e.g., the object gain value information (a_i and b_i) and the object gain ration information (m_i) can be transmitted to a parameter generating unit 1100 in various combinations of the object gain information contained in a bitstream. The combinations can include, for example, (a_i, b_i), (m_i, a_i) and (m_i, b_i). The parameter generating unit 1100 can decode the combinations to reconstruct the original object information. It can be understood that decoding of the combinations performed by the parameter generating unit 1100 can be adapted to other decoders, for example a multi-channel decoder 1300.

Alternatively, when the object gain information is transmitted to the parameter generating unit 1100 in a combination of object gain value information (a_i, b_i), the object gain value information can be scaled. If there is a convention that b_i be scaled to 1, though object level information and only a_i as the object gain information is transmitted, the parameter generating unit 1100 can reconstruct the original object information according to the convention. By scaling the object gain value, the number of the parameters to be transmitted to the parameter generating unit 1100 can be reduced.

Alternatively, the object gain ratio information (m_i) can be obtained from Formula 5:

$$m\_i=a\_i/b\_i,$$

$$m\_i=(a\_i\alpha)/(b\_i+\beta),$$

$$m\_i=(a\_i*s\_i)/(b\_i*s\_i), \quad \text{[Formula 5]}$$

where α, β are small numbers to prevent the numerator and a denominator from being zero.

In cases where the object gain ratio information includes s_i, the same m_i value may not include the same value of s_i. For example, in case of 1) a_i=0.5, b_i=0.5, or 2) a_i=2, b_i=2, each of these cases has the same m_i (=1) and different values of a_i, b_i.

To obtain the processed downmix to be transmitted through each channel, a new method can be used as described by Formula 6:

$$x\_1=\mathrm{sum}\{a\_i'(n)*s\_i'(n)\},$$

$$x\_2=\mathrm{sum}\{b\_i'(n)*s\_i'(n)\}, \quad \text{[Formula 6]}$$

wherein a_i' and b_i' are values that satisfy the following conditions: (a_i'+b_i'=C) or (a_i'^2+b_i^2=C) or (a_i'=C or b_i=C).

Finally, the object gain ratio information can be transmitted m_i'(=a_i'/b_i'). The number of the parameters to be transmitted to the parameter generating unit 1100 can be reduced. To prevent distortion of an audio signal in the decoder 1000 or 2000, m_i can be transmitted.

1.3 Object Correlation Information

Referring to FIG. 4, the parameter decoding unit 1100 receives an object correlation information. The object correlation information is estimated between two objects and represents the correlation/coherence between the two objects.

In case that the two objects originated from the same channel but are transmitted through different channels, object correlation information can exist.

First, if the object signal includes stereo objects, the stereo objects may generate a mono object downmixing stereo objects, and generate a descendant object parameter indicating relations between channels of the stereo objects (hereinafter, this method is also referred to as the 'mono method'). In this case, the object level information is generated using the object level energy of the mono object.

Second, stereo objects recognize two individual mono object signals. In this case, the object level information is generated using the two individual mono object levels (hereinafter, this method is also referred to as the 'stereo method'). The amount of information to be transmitted using the second method can be more than the first method.

To process a stereo object, for example, a first channel signal of stereo objects may be s_i, a second channel signal of stereo objects is s_j as each mono object signal.

The object level of above channel signal may be Ps_i, Ps_j.

In case of a stereo object, each object information representing L and R channels of a given object is similar to each other. So, the object correlation information can be used to represent similarity between the objects information.

Therefore, to encode Ps_i and Ps_j, each mono object using the stereo method is considered as constituting the same object.

The object correlation information includes one of channel power as representative, for example, left channel of stereo object, and normalized power value using the representation described in Formula 7:

$$Ps\_j'=Ps\_j/Ps\_i \text{ or}$$

$$Ps\_j'=10\log 10(Ps\_j)-10\log 10(Ps\_i)=10\log 10(Ps\_j/Ps\_i). \quad \text{[Formula 7]}$$

To reduce the number of transmitted bits of object information, it can be effective to use object correlation information.

And the object correlation information can be generated using the representation described in Formula 8:

$$Ps\_i',Ps\_j'=Ps\_i,Ps\_j/sqrt(Ps\_i*Ps\_j). \quad \text{[Formula 8]}$$

The object correlation information can represent a relation between objects, whether or not the objects are both channels of the same stereo or multi-channel object, that is, each object can be a different channel of same origin.

Additionally, regarding the relation between two objects, differential information can be used.

The differential information can include a sum or subtraction signal of the stereo object as described in Formula 9:

$$M=(L+R)/2, S=(L-R)/2,$$

$$Ps\_M=(Ps\_L+Ps\_R)/2, Ps\_S=(Ps\_L-Ps\_R)/2. \quad \text{[Formula 9]}$$

The object correlation information including above the M and Ps_M can improve transmission efficiency and make it easy to perform an error balance.

The number of object correlation information can vary adaptively according to constituted a same object in order to reduce the bit rate of a object parameter. A flag information 'correlation_flag' indicating whether an object is part of a stereo or multi-channel object, and can be received from the object information. The correlation_flag can be included the object information, and received the information generating unit 1100.

An example meaning of a flag information 'correlation_flag' is shown in Table 1.

TABLE 1

| Correlation_flag | Meaning |
|---|---|
| 1 | Correlation |
| 0 | No correlation |

In case that 'correlation_flag' is equal to 0, the object correlation information is not transmitted to the object correlation information decoding unit 1130*a*. When the 'correlation_flag' is not received to the decoder 1000 or 2000, a default value can be used to process the downmix of the audio signal. Otherwise ('correlation_flag' is equal to 1), the object correlation information is transmitted to the object correlation information decoding unit 1130*a* and represents a similarity between the selected two objects.

The object information can further include reference information separately. When the reference information exists, the reference information can be a identifier for an MCU combiner, for example.

In some embodiments, a method of encoding for an audio signal according to the present invention comprises the step of receiving a multi-object audio signal and the step of generating a downmix of an audio signal and an object information including an object level information, an object gain information, and an object correlation, the object level information and the object correlation information from the multi-object audio signal, characteristics of the object level information, the object gain information, and the object correlation is same as that of the decoding method. So, the method of encoding for an audio signal cording to the present invention may not be limited as above identified.

Additionally, an apparatus of encoding for an audio signal according to the present invention comprises a downmixing unit generating a downmix of an audio signal from a multi-object audio signal, and an object information unit extracting an object information including an object level information, an object gain information, and an object correlation information from the multi-object audio signal. The apparatus of encoding for an audio signal may not be limited as above identified.

MCU Combiner

An audio signal comprising multi-object signals can be used by an MCU combiner to control object gain and output in a remote conference and so on. In case the audio signal comprising multi-object signals, it may be effective to control object gain and panning corresponding to characteristic of each object signal.

For example, the multi-channel audio signal includes vocal sound, background music (BGM) and narration sound. As occasion demands, we cannot detect or control a special kind of object signals when we only use or listen to background music without vocal sound and narration sound or only make a communication with someone in a teleconference.

Additionally, the method of decoding for the present invention using object information may be used to an enhanced karaoke system.

Figure 6:
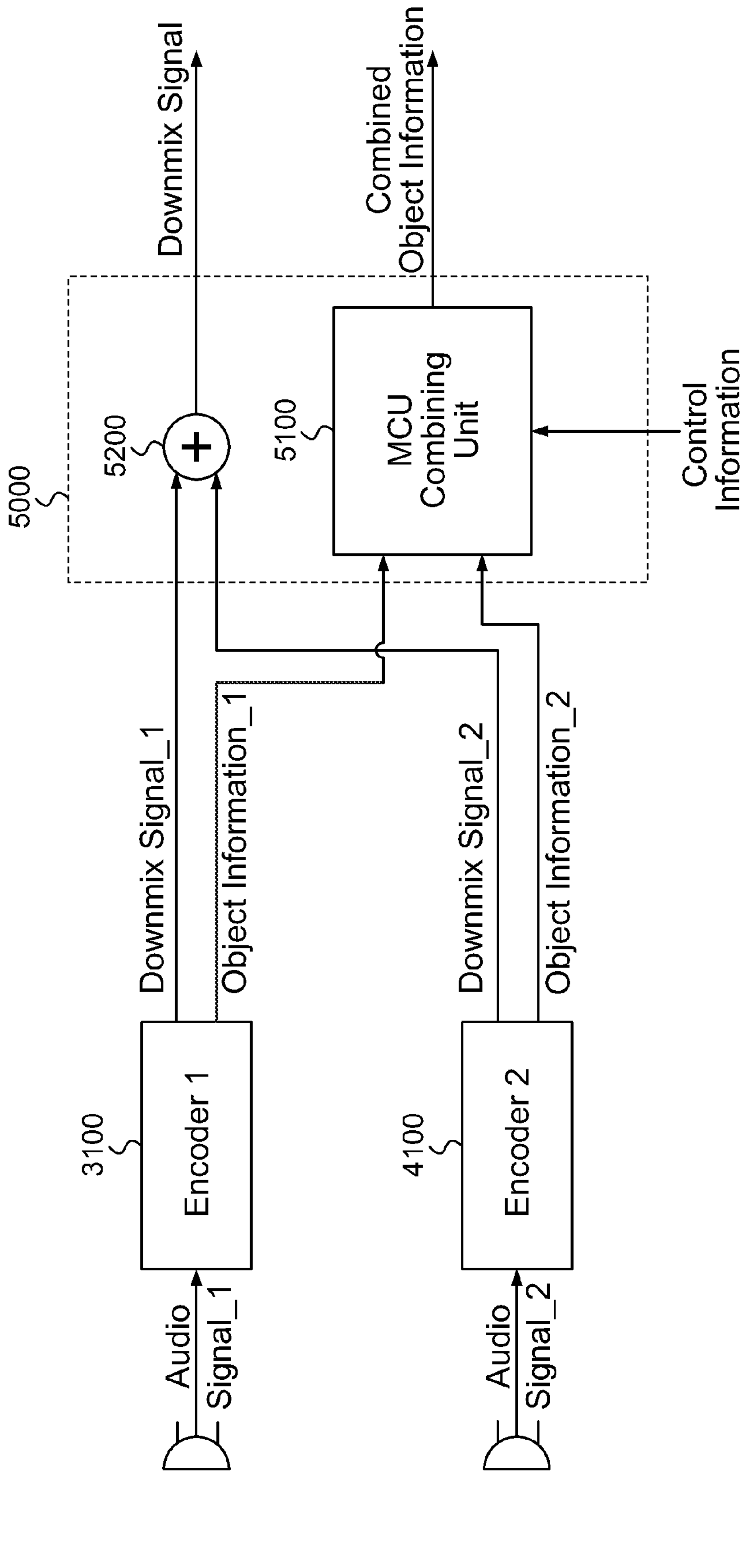
FIG. 6 is an exemplary block diagram of a parameter generating unit according to other embodiment of the present invention.

FIG. 6 is an exemplary block diagram of an apparatus for processing an audio signal according to an embodiment of present invention. Referring to FIG. 6, an apparatus for processing an audio signal according to embodiment may comprise an encoder 1 3100, an encoder 2 4100, a combining unit 5000 including a MCU combining unit 5100 and downmixer 5200. The encoder 1 3100 and the encoder 2 4100 can be configured to receive each an audio signal_1 or an audio signal_2 and to generate a downmix signal_1 and an object information_1 in the encoder 1 3100, and to generate a downmix signal_2 and an object information_2 in the encoder 2 4100.

The combining unit 5000 can be configured to receive the downmix_1 and the object information_1 from the encoder 1 3100, the downmix_2 and the object information_2 from the encoder 2 4100, and a control information from user control, and to generate a downmix and a combined object information.

The downmix, output signal of the combining unit 5000, can be generated a conventional downmixing unit. Therefore, details of elements of the down mixer 5200 shall be omitted.

2.1 Combined Object Parameter

Figure 7:
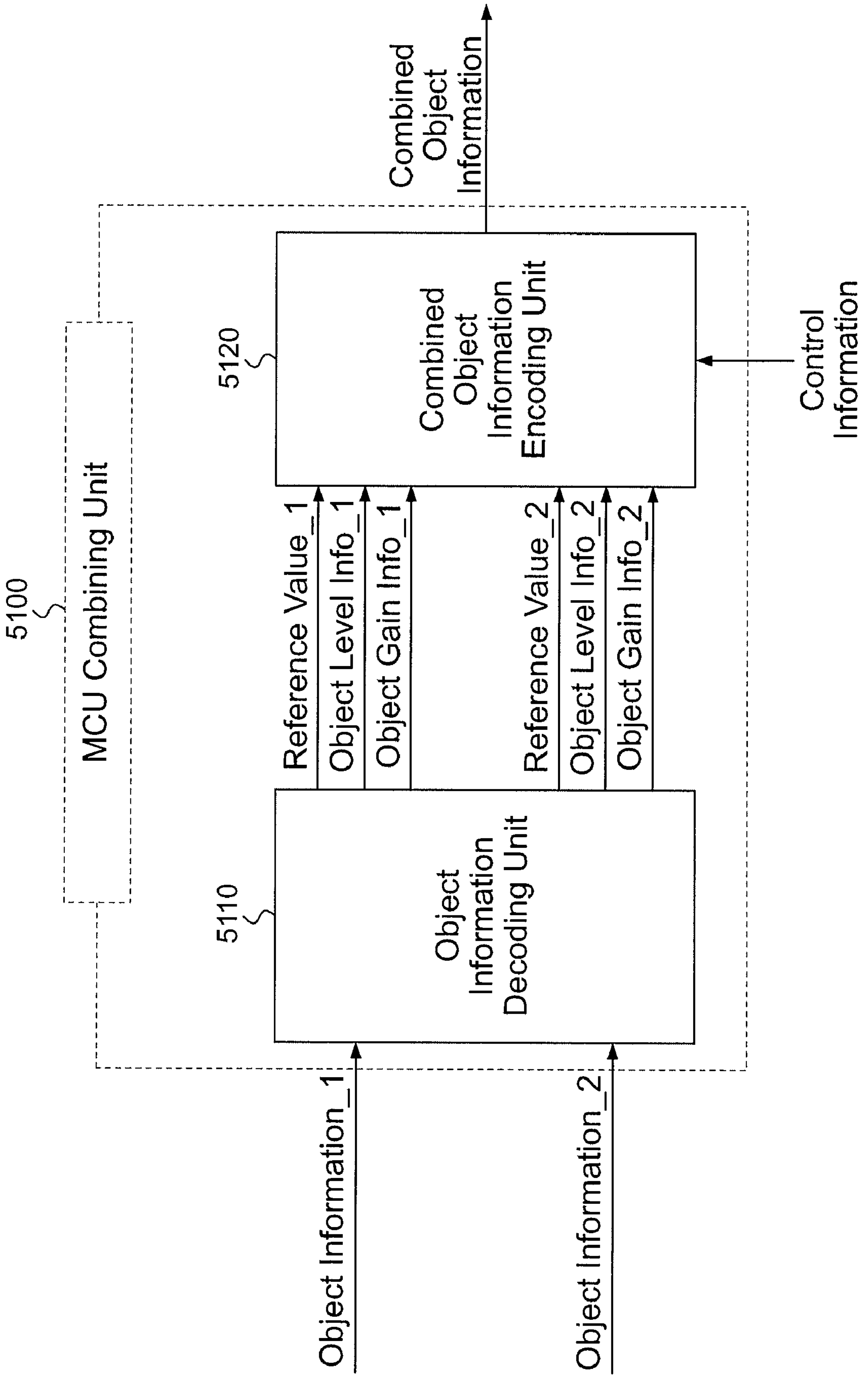
FIG. 7 is an exemplary block diagram of an apparatus for processing an audio signal according to other embodiment of the present invention.

FIG. 7 is an exemplary block diagram of an apparatus for processing an audio signal according to an embodiment of present invention, in particular, an exemplary block diagram of an MCU combining unit 8100. Referring to FIG. 7, the MCU combining unit 5100 can be configured to generated a combined object information using the object information_1, the object information_2, and the control information. The combined object information includes all information corresponding to the downmix_1 from the encoder 1 3100 and the downmix_2 from the encoder 2 4100.

The MCU combining unit 5100 includes an object information decoding unit 5110 and a combined object information encoding unit 5120. The object information decoding unit 5110 can be configured to receive the object information_1 from the encoder 1 3100 and the object information_2 from the encoder 2 4100, and to generate a reference value_1, an object level information_1, and an object gain information_1 from the object information_1, and a reference value_2, an object level information_2, and an object gain information_2. The reference values, the object level information, and the object gain information is same as that of FIG. 1~FIG. 6. Therefore, details of generating method of those information shall be omitted.

And the MCU combining unit 5100 can be configured to receive at least two object information from each multiple encoders without limitation of input signals, and to generate the combined object information comprising several information corresponding to the downmix.

2.2 Control Information

Figure 8:
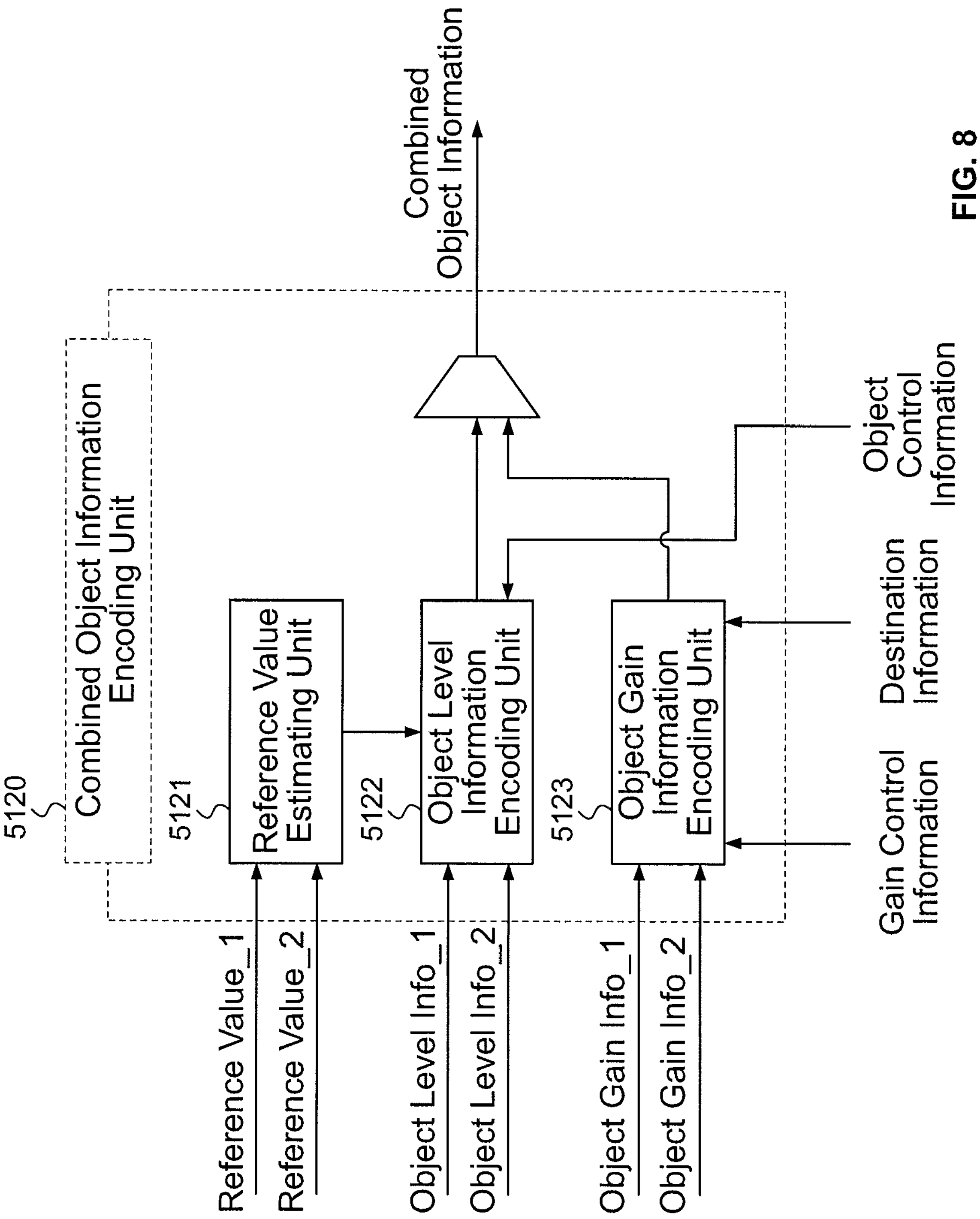
FIG. 8 is an exemplary block diagram of a MCU combining unit according to one embodiment of the present invention.

FIG. 8 is an exemplary block diagram of an apparatus for processing an audio signal according to an embodiment of present invention, in particular, an exemplary block diagram of a combined object information encoding unit 5120. Referring to FIG. 8, the combined object information encoding unit 5120 can be configured to receive those information and a control information from user control, and to generate a combined object information to be inputted in a decoder (not shown).

The control information may process the object information_1 and the object information_2, and apply to combination of above the object information_1 and the object information_2 in the combined object information encoding unit 5120. The combined object information may be generated to be processed the control information, the control information indicating to combine some objects constituted the combined object information and to control object gain in the combination of the object information.

The control information includes an object control information, a gain control information, and a destination information. Each of the object control information, the gain control information, and the destination information may explain the followings.

2.2.1 Object Control Information

The object control information may determine target objects to generate the combined object information. The object control information can determine a required subset of audio objects of object information_1 or object information_2.

The object control information may be processed to the object level information in the object level information encoding unit 5122. The combined object information may include information corresponding to some objects determining by the object control information, and can be use according to several purposes.

For example, the object information_1 comprises music including vocal, piano, guitar object signals, and the object information_2 comprises violin, vocal object signals. To generate an audio signal comprising piano, guitar, violin object signals, we can obtain the combined object information using the object control information from user control without vocal object signals.

2.2.2 Gain Control Information

The object gain information encoding unit 5123 can be configured to receive a gain information_1 from the object information_1, a gain information_2 from the object information_2, a gain control information, and a destination information, and to generate an object gain information of the object information.

The gain control information may be used to control object gain for MCU combiner. Unlike the object control information, the gain control information may be processed in the object gain information encoding unit 5123, the object information is selected using the object control information in the object level information encoding unit 5122. The gain control information may be a value within in the range of 0~1.

2.2.3 Destination Information

Among the range of the gain control information, If the gain control information corresponding to object information_i is 0, the object information does not included in the combined object information. When the gain control information is 0 or 1, the gain control information defines a destination information. The destination information may include the special gain control information having 0 or 1 value and the indicators which destinations are to be outputted the downmix.

The destination information can be used for special function, for example, a whisper function, a secret meeting, and for controlling the destination of an object signal.

Referring to the FIG. 8, the destination information may be inputted into the object gain information encoding unit 5123, and process the gain information_1 and the gain information_2 to control object gain of the combined object information. If a MCU combiner has 3-ports, the destination information may include each gain value (0, 1) corresponding to each output port.

The gain control information and the destination information may be inputted at once or separately into the object gain information encoding unit 5123.

2.3 Process of Generating a Combined Object Information

FIG. 8 is an exemplary block diagram of the combined object information encoding unit 5120. Referring to FIG. 8, the combined object information encoding unit 5120 can be configured to receive a reference value_1, a reference value_2, an object level information_1, an object level information_2, an object gain information_1, an object gain information_2, an object control information, a gain control information, and a destination information, and to generate a combined object information using the object control information, the gain control information, and the destination information.

2.3.1 Determining of Reference Information

Again referring to FIG. 8, the combined object information encoding unit 5120 includes a reference value generating unit 5121, an object level information encoding unit 5122, and an object gain information encoding unit 5123.

To generate the combined object information, first, a reference information of the combined object information may be estimated. Each object information_i may include reference information to normalize each object level, and to generate an object level information. But, in case of combining at least two object information to generate a combined object information, the combined object information may determine to normalize the object level constituted to the object level information of the combined object information.

The reference information of the combined object information may be determine by several methods. For example, the reference information of the combined object information may be the reference information_1 or the largest reference information of the object information_i.

Instead of a change of the reference information, the combined object information may use the object level information of the object information_i as that of the combined object information.

2.3.2 Object Level Information of the Combined Object Information

The reference value estimating unit 5121 may estimate the reference information of the combined object information as the above method. Before the change of the reference information of the combined object information, the object level information_i is normalized by the reference information_i.

We assume that the object level information of the object information_1 is the [formula 10], and the object level information of the combined object information is the [formula 11].

$OL\_1n=EO\_1n$/reference information of the object information_1 [Formula 10]

(OL_1*n* is a nth object level information of the object information_1, EO_1*n* is a nth object level energy of the object information_1)

$OL\_k=OL\_1n$*reference information of the object information_1/reference information of the object information [Formula 11]

(OL_k is a kth object level information of the combined object information)

2.3.3 Object Gain Information

The object gain information encoding unit 5123 can be configured to receive an object gain_1, an object gain_2, a gain control information, and a destination information, and to generate an object gain information using the gain control information and the destination information. In case that the destination information from user control indicates on/off of the object information, that is, the destination information is 0 or 1, the object gain information of the object information_i is 0 or 1. In case that the gain control information may be inputted from user control, the object gain information_1 and the object gain information_2 can be changed using the gain control information.

2.3.4 Object Correlation Information

The object correlation information indicates similarity/dissimilarity between the channels of a stereo object or a multi-channel object, so the object correlation information may be affected by combining object information in the MCU combining unit 5100.

The object correlation information of the combined object information may be included the object correlation information of the object information_i as it is.

Figure 9:
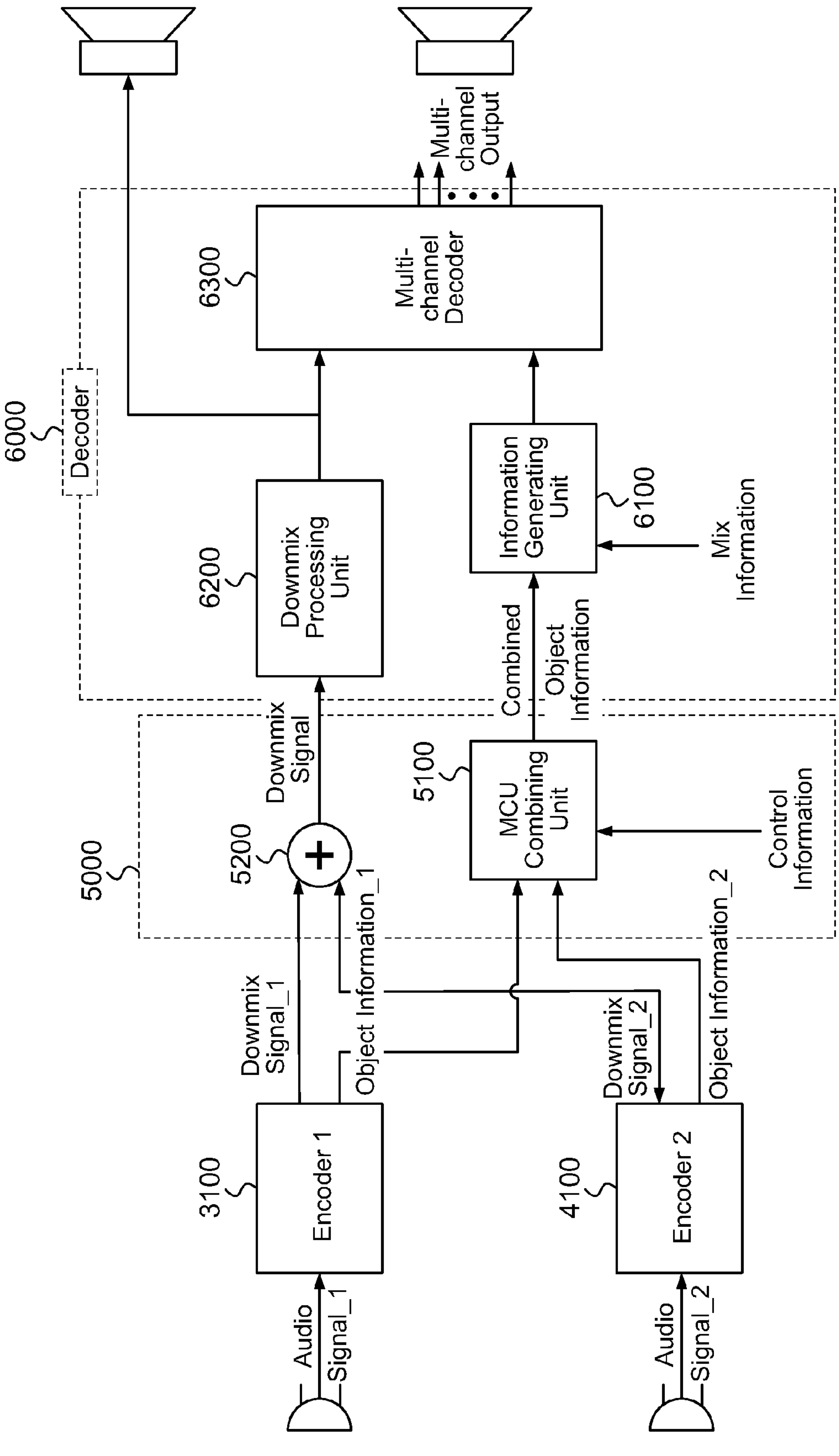
FIG. 9 is an exemplary block diagram of a combined object parameter encoding unit according to one embodiment of the present invention.

FIG. 9 is an exemplary block diagram of an apparatus for coding an audio signal according to one embodiment of the present invention. The apparatus for coding an audio signal includes an encoder 1 3100, an encoder 2 4100, a MCU combining unit 5100, a mixer 5200 and a decoder 6000. The decoder 6000 includes an information generating unit 6100, a downmix processing unit 6200 and a multi-channel decoder 6300. The encoder 1 3100, the encoder 2 4100, the MCU combining unit 5100, the mixer 5200, the information generating unit 6100, the downmix processing unit 6200 and the multi-channel decoder 6300 have the same configurations and functions of the former an encoder 1 3100, an encoder 4100, a MCU combining unit 5100 and a downmixer 5200 of FIG. 6, an information generating unit 1100, a downmix processing unit 1200 and multi-channel decoder 1300 of FIG. 1. Therefore, these details are omitted in the following description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of decoding an audio signal performed by an audio coding system, comprising:

receiving a downmix signal, object gain information and object level information, (a) the downmix signal generated by downmixing a multi-object audio signal including at least two object signals, wherein each object signal is capable of being located at a different virtual position, (b) the object gain information comprising an object gain value applied to one object signal for generating the downmix signal if the number of channels of the downmix signal is equal or greater than one and further including an object gain ratio indicating a gain difference between the at least two object signals contributing to the downmix signal if the number of channels of the downmix signal is equal or greater than two, and (c) the object level information being generated by dividing an object level with a normalization object level, the normalization object level being a maximum value among multiple object levels;

calculating downmix processing information controlling the at least one object signal included in the downmix signal by using the object gain information and the object level information;

calculating multi-channel information to upmix the downmix signal to a multi-channel audio signal by using the object gain information and the object level information;

modifying the downmix signal by modifying at least one of gain and position of at least one object signal included in the downmix signal by applying the downmix processing information to the downmix signal; and generating the multi-channel audio signal by applying the multi-channel information to the modified downmix signal.

2. The method of claim 1, wherein a quantity of the object level information is the same as a quantity of object signals in the downmix signal.

3. A method of encoding an audio signal performed by an audio coding system, comprising:

generating a downmix signal by downmixing a multi-object audio signal including at least two object signals, wherein each object signal is capable of being located at a different virtual position;

generating an object gain value applied to one object signal for generation of the downmix signal in case that a if the number of channels of the downmix signal is equal or greater than one;

generating an object gain ratio indicating a gain difference between the at least two object signals contributing to the downmix signal if the number of channels of the downmix signal is equal or greater than two; and generating object level information by dividing an object level with a normalization object level, wherein the normalization object level is a maximum value among multiple object levels.

4. An apparatus for decoding an audio signal, comprising:

a processor of an information generating unit;

receiving a downmix signal, object gain information and object level information, (a) the downmix signal generated by downmixing a multi-object audio signal including at least two object signals, wherein each object signal is capable of being located at a different virtual position, (b) the object gain information comprising an object gain value applied to one object signal for generating of the downmix signal if the number of channels of the downmix signal is equal or greater than one and further including an object gain ratio indicating a gain difference between the object signals contributing to the downmix signal if the number of channels of the downmix signal is equal or greater than two, and (c) the object level information being generated by dividing an object level with a normalization object level, the normalization object level being a maximum value among multiple object levels;

a processor of a downmix processing information calculating unit operable for calculating downmix processing information, used to modify the downmix signal by controlling at least one object signal included in the downmix signal by using the object gain information and the object level information; and a processor of a multi-channel information calculating unit operable for calculating multi-channel processing information to upmix the downmix signal to a multi-channel audio signal, by using the object gain information and the object level information; and a processor of a multi-channel decoder operable for generating the multi-channel audio signal by applying the multi-channel information to the modified downmix signal.

5. The apparatus of claim 4, wherein a quantity of the object level information is the same as a quantity of object signal in the downmix signal.

* * * * *